(12) United States Patent
Nakanishi et al.

(10) Patent No.: US 11,874,548 B2
(45) Date of Patent: Jan. 16, 2024

(54) IMAGE FORMING PANEL DEVICE AND PROJECTOR

(71) Applicant: SEIKO EPSON CORPORATION, Tokyo (JP)

(72) Inventors: Masanobu Nakanishi, Azumino (JP); Tomoaki Miyashita, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/698,117

(22) Filed: Mar. 18, 2022

(65) Prior Publication Data

US 2022/0299817 A1 Sep. 22, 2022

(30) Foreign Application Priority Data

Mar. 18, 2021 (JP) .................................. 2021-044637

(51) Int. Cl.
*G02F 1/1333* (2006.01)
*H04N 9/31* (2006.01)

(52) U.S. Cl.
CPC .. *G02F 1/133382* (2013.01); *G02F 1/133308* (2013.01)

(58) Field of Classification Search
None
See application file for complete search history.

(56) References Cited

U.S. PATENT DOCUMENTS

| 5,886,763 A | * | 3/1999 | Wolkowicz | ......... G02F 1/13452 349/161 |
| 2004/0021830 A1 | | 2/2004 | Fujimori et al. | |
| 2004/0201877 A1 | | 10/2004 | Fujimori et al. | |
| 2014/0104670 A1 | * | 4/2014 | Feng | ..................... G02F 1/0147 359/288 |
| 2016/0097941 A1 | | 4/2016 | Feng et al. | |

FOREIGN PATENT DOCUMENTS

| CN | 103728744 A | 4/2014 |
| JP | H11-305203 A | 11/1999 |
| JP | 2004-021056 A | 1/2004 |
| JP | 2008-122491 A | 5/2008 |

* cited by examiner

*Primary Examiner* — Phu Vu
(74) *Attorney, Agent, or Firm* — Dority & Manning, P.A.

(57) ABSTRACT

An image forming panel device according to the present disclosure includes a panel unit including a first surface and a second surface on the opposite side of the first surface and including a panel configured to emit image light, a first metal frame disposed around an image forming region on at least one of the first surface and the second surface of the panel unit and having thermal conductivity, and a first planar heat generating body provided on a surface on the opposite side of a side where the panel unit is provided in the first metal frame and including a first heat generating wire for supplying heat to the entire periphery of the first metal frame.

11 Claims, 5 Drawing Sheets

IMAGE FORMING PANEL DEVICE AND PROJECTOR

The present application is based on, and claims priority from JP Application Serial Number 2021-044637, filed Mar. 18, 2021, the disclosure of which is hereby incorporated by reference herein in its entirety.

BACKGROUND

1. Technical Field

The present disclosure relates to an image forming panel device and a projector.

2. Related Art

There has been known a technique for heating a peripheral edge portion of an image forming panel such as a liquid crystal panel for the purpose of, for example, uniformizing transmittance in the panel. JP-A-11-305203 (Patent Literature 1) discloses a liquid crystal projector including a liquid crystal panel, an attachment plate to which the liquid crystal panel is fixed, and a heater provided in the attachment plate. JP-A-2008-122491 (Patent Literature 2) discloses a projector including liquid crystal panels, polarizing filters sandwiching the liquid crystal panels, and a heater provided in peripheral edge portions of the polarizing filters.

Patent Literature 1 describes fixing of the heater to the attachment plate to which the liquid crystal panel is fixed but does not describe a specific attachment structure. Therefore, it is unclear how the heat of the heater is propagated to the liquid crystal panel. In Patent Literature 2, in general, gaps are present between the liquid crystal panels and the polarizing filters. In that case, it is difficult to for the heater to efficiently heat the peripheral edge portions of the liquid crystal panels.

SUMMARY

An image forming panel device according to an aspect of the present disclosure includes: a panel unit including a first surface and a second surface on an opposite side of the first surface and including a panel configured to emit image light; a first metal frame disposed around an image forming region on at least one of the first surface and the second surface of the panel unit and having thermal conductivity; and a first planar heat generating body provided on a surface on an opposite side of a side where the panel unit is provided in the first metal frame and including a first heat generating wire for supplying heat to an entire periphery of the first metal frame.

A projector according to an aspect of the present disclosure includes: an illumination unit; the image forming panel device according to the aspect of the present disclosure configured to modulate light emitted from the illumination unit and form the image light; and a projection optical unit configured to project the image light emitted from the image forming panel device.

DESCRIPTION OF EXEMPLARY EMBODIMENTS

First Embodiment

A first embodiment of the present disclosure is explained below with reference to FIGS. 1 to 6.

Figure 1:
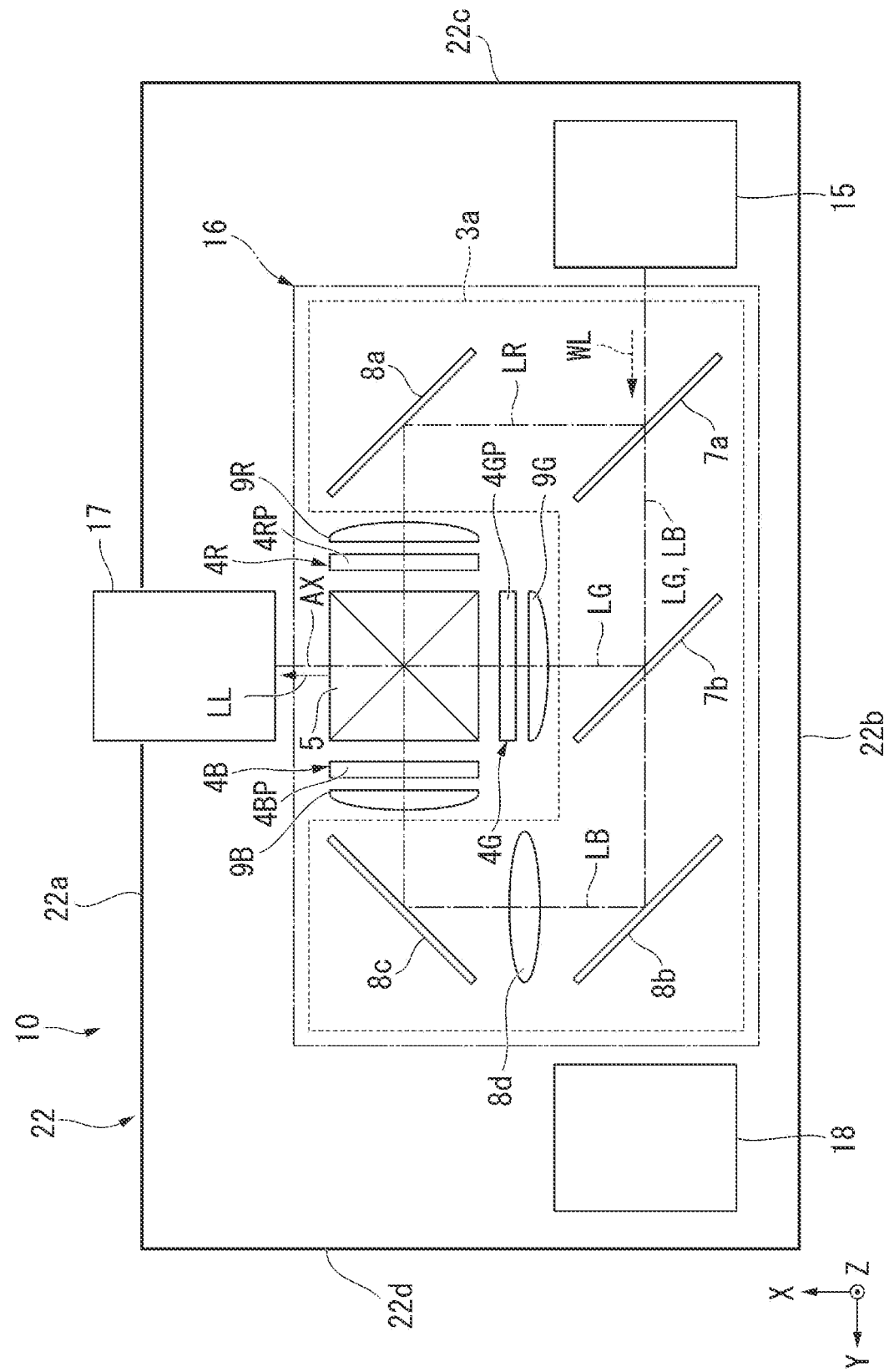
FIG. 1 is a schematic diagram showing a schematic configuration of a projector in a first embodiment.

FIG. 1 is a schematic diagram showing a schematic configuration of a projector 10 in the first embodiment.

In the drawings referred to below, scales of dimensions are sometimes shown to be different depending on components in order to clearly show the components.

In the drawings used in the following explanation, an XYZ orthogonal coordinate system is used according to necessity.

An X axis is an axis obtained by projecting an optical axis of light emitted from a projection optical unit 17 when a projector 10 is viewed from above and is an axis extending along the front-rear direction. A Z axis is an axis orthogonal to the X axis and extending along the up-down direction. A Y axis is an axis orthogonal to the X axis and the Z axis and extending along the left-right direction. In the following explanation in this embodiment, a near side viewed from an observer located behind the projector 10 is represented as a −X side, a depth side viewed from the observer is represented as a +X side, an upper side viewed from the observer is represented as a +Z side, a lower side viewed from the observer is represented as a −Z side, a right side viewed from the observer is represented as a +Y side, and a left side viewed from the observer is represented as a −Y side. The X axis is defined as a direction in which a front surface 22a and a back surface 22b of an exterior case 22 are opposed. The Y axis is defined as a direction in which a right side surface 22c and a left side surface 22d of the exterior case 22 are opposed. The Z axis is defined as a direction in which the top surface and the bottom surface of the exterior case 22 are opposed.

As shown in FIG. 1, the projector 10 includes the exterior case 22, an illumination unit 15, an image forming unit 16, the projection optical unit 17, a power supply unit 18, and a control unit (not shown).

The exterior case 22 houses the illumination unit 15, the image forming unit 16, the projection optical unit 17, the power supply unit 18, and the control unit. Although not shown in FIG. 1, the exterior case 22 is configured from an upper case, a lower case, a front case, and a rear case.

Although not shown in FIG. 1, the illumination unit 15 includes components such as a laser light source and a wavelength conversion element. The illumination unit 15 condenses, with a condensing lens, as excitation light, blue laser light emitted from the laser light source, makes the blue laser light incident on the wavelength conversion element including a phosphor, and emits white light formed by the blue laser light and yellow fluorescent light. The illumination unit 15 is not limited to the configuration including the laser light source and the wavelength conversion element. For example, a configuration including the laser light source alone or a configuration including an LED (Light Emitting Diode) or a light source lamp of a discharge type may be applied as the illumination unit 15. The illumination unit 15 may include a heat radiating member such as a heat sink that emits heat generated by a light emission source to the outside.

The image forming unit 16 includes a color separation optical system 3a, an image forming panel device 4R, an image forming panel device 4G, an image forming panel device 4B, and a light combining element 5. The image forming unit 16 modulates, based on image information, light emitted from the illumination unit 15 and generates image light. The color separation optical system 3a, the image forming panel device 4R, the image forming panel device 4G, the image forming panel device 4B, and the light combining element 5 are held by a predetermined holding member (not shown) and configure the image forming unit 16.

The color separation optical system 3a separates white light WL emitted from the illumination unit 15 into red light LR, green light LG, and blue light LB. The color separation optical system 3a includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the white light WL emitted from the illumination unit 15 into the red light LR and mixed light of the green light LG and the blue light LB. The first dichroic mirror 7a reflects the red light LR and transmits the green light LG and the blue light LB. The second dichroic mirror 7b separates the mixed light of the green light LG and the blue light LB into the green light LG and the blue light LB. The second dichroic mirror 7b reflects the green light LG and transmits the blue light LB.

The first reflection mirror 8a is disposed in an optical path of the red light LR. The first reflection mirror 8a reflects, toward the image forming panel device 4R, the red light LR reflected by the first dichroic mirror 7a. The second reflection mirror 8b and the third reflection mirror 8c are disposed in an optical path of the blue light LB. The second reflection mirror 8b and the third reflection mirror 8c guide the blue light LB transmitted through the second dichroic mirror 7b to the image forming panel device 4B.

The image forming panel device 4R is configured from a liquid crystal panel 4RP and polarizing plates (not shown) respectively provided on an incidence side and an emission side of the liquid crystal panel 4RP. The image forming panel device 4G is configured from a liquid crystal panel 4GP and polarizing plates (not shown) respectively provided on an incidence side and an emission side of the liquid crystal panel 4GP. The image forming panel device 4B is configured from a liquid crystal panel 4BP and polarizing plates (not shown) respectively provided on an incidence side and an emission side of the liquid crystal panel 4BP.

The image forming panel device 4R modulates, according to an image signal, the red light LR in light emitted from a light source unit. The image forming panel device 4G modulates, according to an image signal, the green light LG in the light emitted from the light source unit. The image forming panel device 4B modulates, according to an image signal, the blue light LB in the light emitted from the light source unit. Consequently, the image forming panel devices 4R, 4G, and 4B form image light LL corresponding to the color lights.

On a light incidence side of the image forming panel device 4R, a field lens 9R that collimates the red light LR made incident on the image forming panel device 4R is disposed. On a light incidence side of the image forming panel device 4G, a field lens 9G that collimates the green light LG made incident on the image forming panel device 4G is disposed. On a light incidence side of the image forming panel device 4B, a field lens 9B that collimates the blue light LB made incident on the image forming panel device 4B is disposed.

The light combining element 5 is configured from a substantially cubical cross dichroic prism. The light combining element 5 combines the color lights emitted from the image forming panel devices 4R, 4G, and 4B to generate the image light LL. The light combining element 5 emits the image light LL toward the projection optical unit 17.

The projection optical unit 17 enlarges and projects the image light LL emitted from the image forming unit 16 toward a screen (not shown). The image light LL is projected from the projection optical unit 17, whereby a color image is displayed on the screen. The screen is disposed in the front (on the +X side) of the projector 10 shown in FIG. 1.

The projection optical unit 17 in this embodiment is coupled to the image forming unit 16 in a +X direction. The projection optical unit 17 includes a plurality of projection lenses. The number of projection lenses is not particularly limited.

The power supply unit 18 supplies, to the illumination unit 15, electric power supplied from an external power supply coupled to the projector 10.

The control unit is configured from a circuit board that controls the sections of the projector 10.

Various wires are formed and various electronic components are mounted on the control unit.

Figure 2:
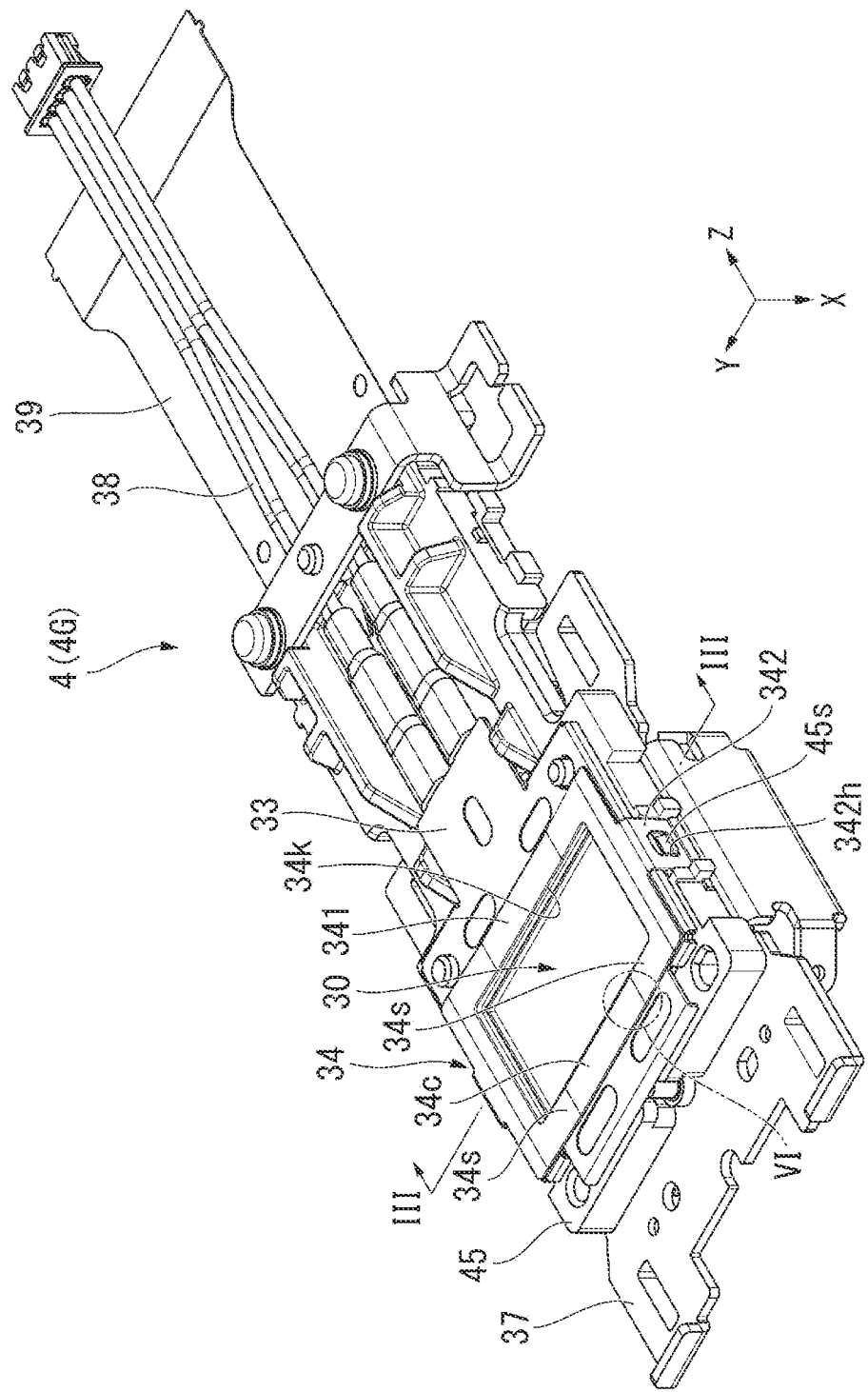
FIG. 2 is a perspective view of an image forming panel device in the first embodiment.
Figure 3:
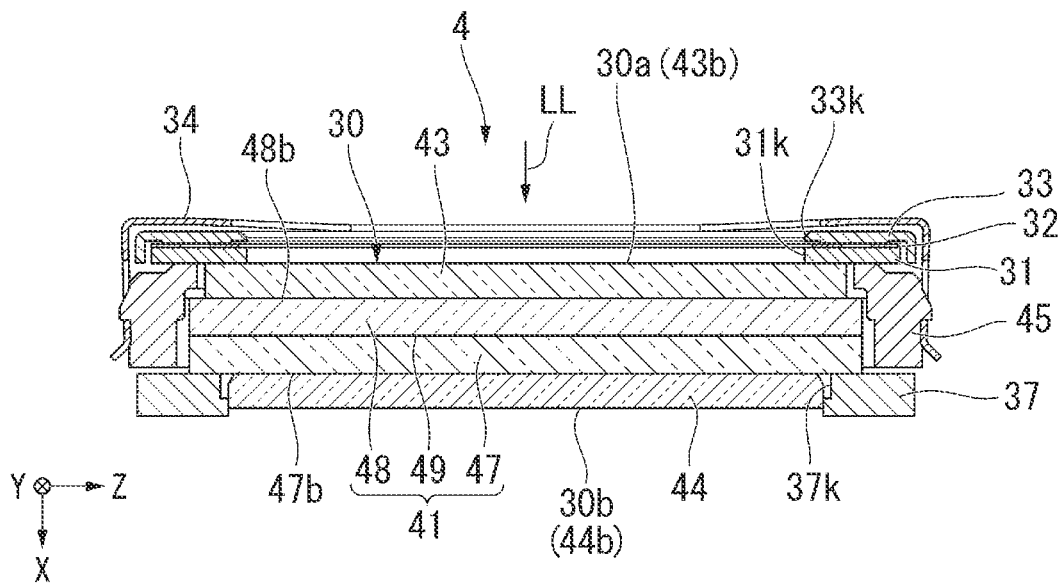
FIG. 3 is a sectional view taken along a III-III line in FIG. 2.
Figure 4:
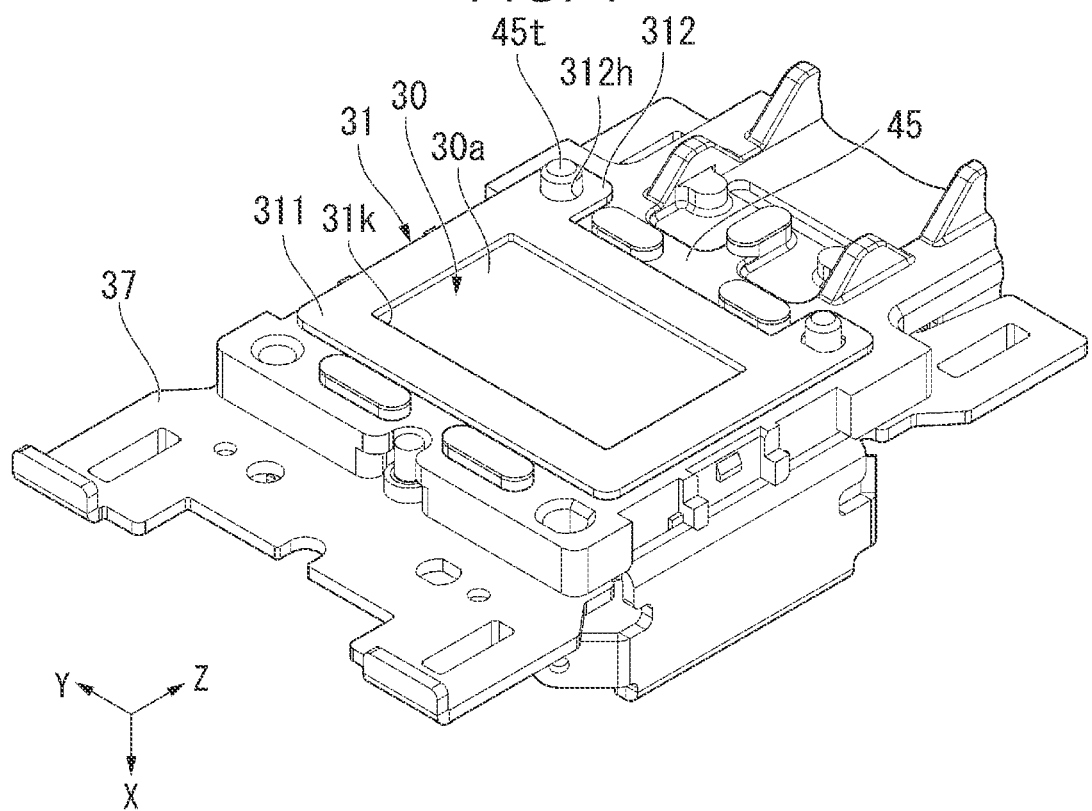
FIG. 4 is a perspective view of a state in which a first metal frame is set on a panel holding frame.
Figure 5:
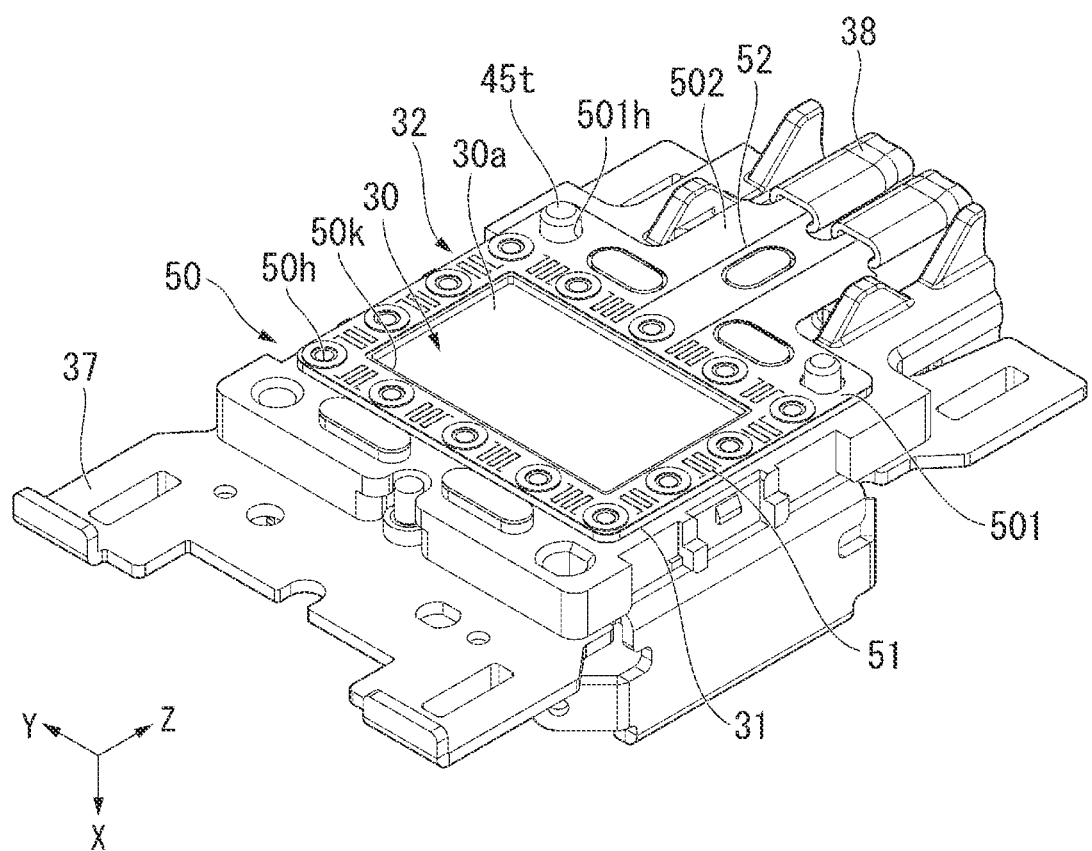
FIG. 5 is a perspective view of a state in which a first heater is further set on the first metal frame shown in FIG. 4.
Figure 6:
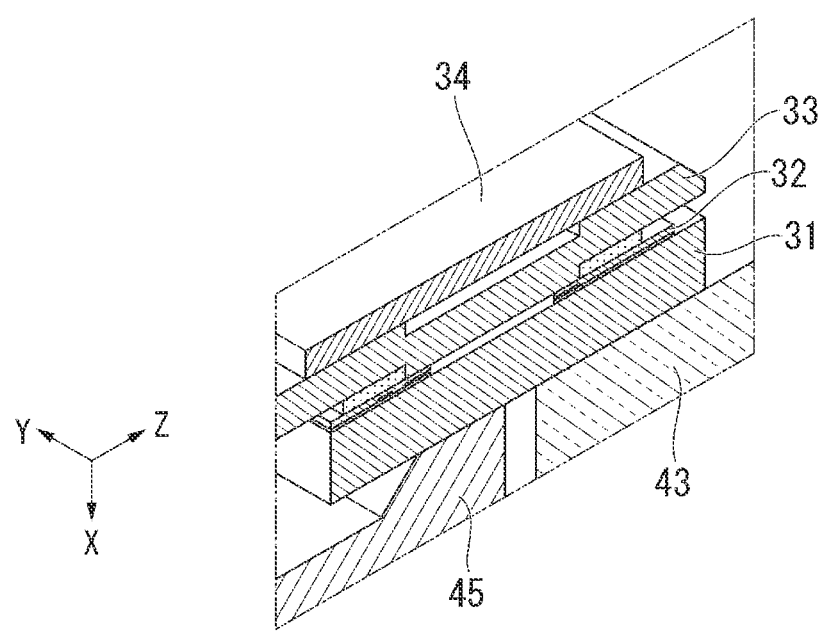
FIG. 6 is a sectional view showing disposition of constituent members relating to heating of a panel.

FIG. 2 is a perspective view showing an image forming panel device 4 in this embodiment. FIG. 3 is a sectional view taken along a III-III line in FIG. 2. FIG. 4 is a perspective view of a state in which a first metal frame 31 is set on a panel holding frame 45. FIG. 5 is a perspective view of a state in which a first heater 32 is further set on the first metal frame 31 shown in FIG. 4. FIG. 6 is a sectional view of a part indicated by a circle of a sign VI in FIG. 2 and is a sectional view showing disposition of constituent members relating to heating of a panel 41.

Since basic configurations of the image forming panel device 4R, the image forming panel device 4G, and the image forming panel device 4B are the same, the image forming panel device 4G that modulates the green light LG is representatively explained as the image forming panel device 4.

As shown in FIGS. 2 and 3, the image forming panel device 4 in this embodiment includes a panel unit 30, the first metal frame 31, the first heater 32, a low thermal conductivity frame 33, a panel pressing member 34, an attachment member 37, a heater wiring cable 38, and a flexible printed board 39.

The first heater 32 in this embodiment corresponds to the first planar heat generating body in claims.

The panel unit 30 includes the panel 41 that emits the image light LL, a first dustproof plate 43, a second dustproof plate 44, and the panel holding frame 45. The panel unit 30 includes a first surface 30a on which light is made incident and a surface different from the first surface 30a, that is, a second surface 30b that is provided on the opposite side of the first surface 30a and emits light. That is, the panel unit 30 in this embodiment is configured by a light transmissive panel unit that transmits light from the first surface 30a toward the second surface 30b of the panel unit 30.

The panel 41 includes an element substrate 47, a counter substrate 48, and a liquid crystal layer 49. Although not shown in FIGS. 2 and 3, the element substrate 47 includes a switching element such as a thin film transistor (TFT), various wires, and a pixel electrode formed on a substrate. The counter substrate 48 includes a counter electrode. The liquid crystal layer 49 is sandwiched between the element substrate 47 and the counter substrate 48. In the following explanation, in order to simplify explanation, in members, a side opposed to the liquid crystal layer 49 is sometimes referred to as inner surface and a surface on the opposite side of the side opposed to the liquid crystal layer 49 is sometimes referred to as outer surface.

The first dustproof plate 43 is provided on an outer surface 48b of the counter substrate 48. The first dustproof plate 43 is made of, for example, optical glass and adheres to the outer surface 48b of the counter substrate 48. The first dustproof plate 43 prevents dust from sticking to the outer surface 48b of the counter substrate 48. The second dustproof plate 44 is provided on an outer surface 47b of the element substrate 47. The second dustproof plate 44 is made of, for example, optical glass and adheres to the outer surface 47b of the element substrate 47. The second dustproof plate 44 prevents dust from sticking to the outer surface 47b of the element substrate 47.

In the case of this embodiment, since light is transmitted from the counter substrate 48 toward the element substrate 47, a light incidence surface (the first surface 30a) of the panel unit 30 is an outer surface 43b of the first dustproof plate 43 and a light emission surface (the second surface 30b) of the panel unit 30 is an outer surface 44b of the second dustproof plate 44. The dustproof plates 43 and 44 do not have to be always provided on both the surfaces of the panel 41 and only have to be provided on at least one of a light incidence surface and a light emission surface of the panel 41. The dustproof plates 43 and 44 may not be provided.

The panel holding frame 45 is configured by a frame-like member surrounding the peripheral edge portion of the panel 41. As shown in FIG. 3, the panel holding frame 45 holds the panel 41 in a state in which the panel holding frame 45 is in contact with the first dustproof plate 43.

As shown in FIG. 4, the first metal frame 31 is disposed on the first surface 30a of the panel unit 30. That is, the first metal frame 31 is disposed on a light incidence side of the panel unit 30. The first metal frame 31 includes a frame section 311 and fixing sections 312.

The frame section 311 is made of a rectangular annular plate material and includes an opening section 31k for exposing an image forming region of the panel unit 30. The fixing sections 312 respectively project in a +Z direction from both the ends in a Y-axis direction of the frame section 311 and includes holes 312h. Protrusion sections 45t provided on one surface of the panel holding frame 45 and the holes 312h of the fixing sections 312 are fit, whereby the first metal frame 31 is positioned with respect to the panel unit 30. In this way, the first metal frame 31 is disposed around the image forming region on the first surface 30a of the panel unit 30. The first metal frame 31 is made of a material having thermal conductivity higher than the thermal conductivity of the low thermal conductivity frame 33 explained below such as aluminum.

As shown in FIGS. 6 and 3, a part of the first metal frame 31 is in contact with the panel holding frame 45.

As shown in FIG. 5, the first heater 32 is disposed on the first metal frame 31. That is, the first heater 32 is provided on a surface on the opposite side of a side where the panel unit 30 is provided in the first metal frame 31. The first heater 32 includes a first heat generating wire 51 for supplying heat to the entire periphery of the first metal frame 31.

More specifically, the first heater 32 includes a base material 50 and the first heat generating wire 51.

The base material 50 is configured from a sheet-like member and includes a frame section 501 and a wiring section 502.

The frame section 501 has a rectangular annular shape and includes an opening section 50k for exposing the image forming region of the panel unit 30. On the inside of the frame section 501, the first heat generating wire 51 is provided over substantially the entire periphery of the frame section 501. The first heat generating wire 51 is made of a metal material and generates heat by being energized. The wiring section 502 includes a wire 52 extending in the +Z direction from the frame section 501 and coupled to the first heat generating wire 51. The heater wiring cable 38 is electrically coupled to an end portion of the wire 52.

The frame section 501 includes a plurality of opening sections 50h provided to avoid the first heat generating wire 51. The plurality of opening sections 50h are disposed at intervals along the peripheral direction of the frame section 501 (the Y-axis direction and a Z-axis direction). The number and the disposition of opening sections 50h are not particularly limited. The first metal frame 31 and the first heater 32 are fixed via an adhesive. Therefore, although not shown in FIG. 6, a thin adhesive layer is formed between the first metal frame 31 and the first heater 32. A part of the adhesive infiltrates into the inside of at least a part of the plurality of opening sections 50h provided in the frame section 501.

In the frame section 501, as in the first metal frame 31, holes 501h are respectively provided in the positions of both the ends in the Y-axis direction of the frame section 501. The protrusion sections 45t provided on one surface of the panel holding frame 45 and the holes 501h are fit, whereby the first heater 32 is positioned with respect to the first metal frame 31 and the panel unit 30 via the panel holding frame 45. In this way, the first heater 32 is disposed around the image forming region on the first surface 30a of the panel unit 30.

As shown in FIG. 3, the low thermal conductivity frame 33 is disposed on the first metal frame 31 to cover the first heater 32. A part of the low thermal conductivity frame 33 is in contact with the first heater 32. Like the first metal frame 31, the low thermal conductivity frame 33 includes an opening section 33k for exposing the image forming region of the panel unit 30. The low thermal conductivity frame 33 is made of a material having thermal conductivity lower than the thermal conductivity of the first metal frame 31 such as stainless steel.

As shown in FIG. 2, the panel pressing member 34 is disposed on the low thermal conductivity frame 33. The panel pressing member 34 includes a frame section 341 and fixing sections 342. The frame section 341 has a rectangular annular shape and includes an opening section 34k for exposing the image forming region of the panel unit 30. The fixing sections 342 respectively project in the +X direction from both the ends in the Y-axis direction of the frame section 341 and include holes 342h. Protrusion sections 45s provided on side surfaces of the panel holding frame 45 and the holes 342h of the fixing sections 342 are fit, whereby the panel pressing member 34 is fixed to the panel holding frame 45 while pressing the low thermal conductivity frame 33 toward the first metal frame 31.

The panel pressing member 34 is configured from, for example, a metallic thin plate having elasticity. When the panel pressing member 34 is viewed from the X-axis direction, the panel pressing member 34 has a shape bent in a direction in which, in a side extending in the Y-axis direction, a center portion 34c projects in the +X direction with respect to both end portions 34s. Therefore, in the panel pressing member 34, the center portion 34c of the side extending in the Y-axis direction presses the low thermal conductivity frame 33 toward the first metal frame 31.

As shown in FIG. 2, the attachment member 37 is used to support the panel unit 30 and the panel holding frame 45 and attach the image forming panel device 4 to a holding member (not shown) that holds the light combining element 5 and the like.

The heater wiring cable 38 supplies electric power to the first heater 32. The electric power supplied to the first heater 32 is desirably individually controlled by a heater control section (not shown). The image forming panel device 4 may include a sensor that detects the temperature of the panel unit 30 and may be configured to adjust, based on a temperature detection value from the sensor, the electric power supplied to the first heater 32.

Wires and various electronic components are mounted on the flexible printed board 39. The flexible printed board 39 supplies various signals including an image signal to the panel 41.

Effects of the First Embodiment

The image forming panel device 4 in this embodiment includes the panel unit 30 including the first surface 30a and the second surface 30b and including the panel 41 that emits the image light LL, the first metal frame 31 disposed around the image forming region on the first surface 30a of the panel unit 30 and having thermal conductivity, and the first heater 32 provided on the surface on the opposite side of the side where the panel unit 30 is disposed in the first metal frame 31 and including the first heat generating wire for supplying heat to the entire periphery of the first metal frame 31.

With this configuration, the heat supplied from the first heater 32 is propagated over the entire periphery of the first metal frame 31 having thermal conductivity and propagated to the panel unit 30 from the first metal frame 31 disposed around the image forming region on the first surface 30a of the panel unit 30. Consequently, the periphery of the image forming region of the panel unit 30 is easily efficiently and equally heated. It is possible to reduce temperature unevenness due to the first heat generating wire 51.

In the image forming panel device 4 in this embodiment, the panel 41 includes the element substrate 47, the counter substrate 48, and the liquid crystal layer 49 sandwiched between the element substrate 47 and the counter substrate 48.

With this configuration, since the temperature of the liquid crystal layer 49 tends to be uniform, it is possible to reduce a transmittance difference of the liquid crystal layer 49 between the center and the peripheral edge portion of the image forming region. Consequently, it is possible to suppress brightness unevenness in the image forming region of the panel 41.

In the image forming panel device 4 in this embodiment, the panel unit 30 further includes the first dustproof plate 43 provided on the light incident surface side of the panel 41.

With this configuration, the heat supplied from the first heater 32 is propagated to the peripheral edge portion of the first dustproof plate 43 via the first metal frame 31 and uniformized and is further propagated from the first dustproof plate 43 to the panel 41. Consequently, it is possible to effectively suppress the temperature of the panel 41 and effectively suppress brightness unevenness in the image forming region.

In the image forming panel device 4 in this embodiment, the panel unit 30 is configured by the light transmissive panel unit that transmits light from the first surface 30a to the second surface 30b of the panel unit 30. The first metal frame 31 is disposed on the light incidence side of the panel unit 30.

With this configuration, the first heater 32 and the first metal frame 31 are provided on the light incidence side on which heat due to light irradiation particularly easily concentrates in the panel unit 30. Therefore, it is possible to effectively suppress the temperature of the panel 41 and effectively suppress brightness unevenness in the image forming region.

In the image forming panel device 4 in this embodiment, the panel unit 30 further includes the panel holding frame 45 that surrounds the peripheral edge portion of the panel 41 and holds the panel 41. A part of the first metal frame 31 is in contact with the panel holding frame 45.

With this configuration, the heat supplied from the first heater 32 is propagated to the panel holding frame 45 as well via the first metal frame 31. Consequently, the panel 41 can be supplementarily heated from the panel holding frame 45 disposed on the side surface side of the panel 41.

The image forming panel device 4 in this embodiment further includes the low thermal conductivity frame 33 provided in contact with the first heater 32 and having thermal conductivity lower than the thermal conductivity of the first metal frame 31.

With this configuration, since the heat supplied from the first heater 32 is relatively less easily propagated to the low thermal conductivity frame 33, the heat can be concentratedly propagated to the first metal frame 31. Since the low thermal conductivity frame 33 is provided, effects of, for example, protecting the base material 50 configuring the first heater 32 and improving environment resistance and uniformizing local pressure by the panel pressing member 34 can be obtained.

In the image forming panel device 4 in this embodiment, the first heater 32 includes the sheet-like base material 50 and the first heat generating wire 51 provided on the base material 50. The base material 50 includes the plurality of opening sections 50h provided to avoid the first heat generating wire 51. The first metal frame 31 and the first heater 32 are fixed via the adhesive. A part of the adhesive infiltrates into at least a part of the plurality of opening sections 50h.

In an assembly process of the image forming panel device 4, if thickness unevenness of the adhesive occurs when the first heater 32 is bonded to the first metal frame 31, it is likely that the first heater 32 lifts from the first metal frame 31 because of a difference between flexibility of the first heater 32 and the hardness of the adhesive. Concerning this problem, with the configuration explained above, since an excess adhesive infiltrates into the opening sections 50h of the base material 50, the thickness of the adhesive layer interposed between the first heater 32 and the first metal frame 31 becomes uniform. As a result the lift of the first heater 32 is suppressed. Heat conduction efficiency from the first heater 32 to the first metal frame 31 can be improved.

The projector 10 in this embodiment includes the illumination unit 15, the image forming panel devices 4B, 4G, and 4R that modulate light emitted from the illumination unit 15 and form the image light LL, and the projection optical unit 17 that projects the image light LL emitted from the image forming panel devices 4B, 4G, and 4R.

With this configuration, it is possible to realize the projector 10 with less brightness unevenness and color unevenness of a projected image.

Second Embodiment

A second embodiment of the present disclosure is explained below with reference to FIG. 7.

The configuration of a projector in the second embodiment is the same as the configuration in the first embodiment. The configuration of an image forming panel device is different from the configuration in the first embodiment. Therefore, explanation of the entire configuration of the projector is omitted.

Figure 7:
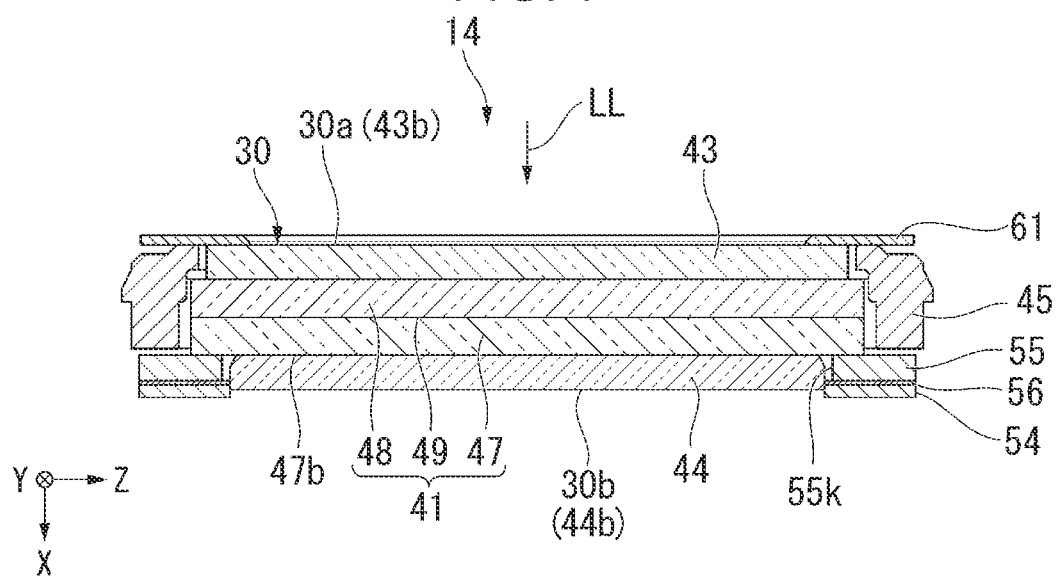
FIG. 7 is a sectional view of an image forming panel device in a second embodiment.

FIG. 7 is a sectional view of the image forming panel device in the second embodiment.

In FIG. 7, components common to FIG. 3 referred to in the first embodiment are denoted by the same reference numerals and signs and explanation of the components is omitted.

As shown in FIG. 7, an image forming panel device 14 in this embodiment includes the panel unit 30, a second metal frame 61, a first metal frame 55, a first heater 56, and a low thermal conductivity frame 54.

The first heater 56 in this embodiment corresponds to the first planar heat generating body in claims.

The panel unit 30 includes the panel 41, the first dustproof plate 43, the second dustproof plate 44, and the panel holding frame 45. The panel unit 30 includes the first surface 30a on which light is made incident and the second surface 30b that emits the light. That is, the panel unit 30 in this embodiment is configured by a light transmissive panel unit that transmits light from the first surface 30a toward the second surface 30b of the panel unit 30.

In the case of this embodiment, unlike the first embodiment, the first metal frame 55 is disposed around an image forming region on the outer surface 47b of the element substrate 47 (the second surface 30b of the panel unit 30). That is, the first metal frame 55 is disposed on a light emission side of the panel unit 30. The first metal frame 55 includes an opening section 55k for exposing the image forming region of the panel unit 30.

The first heater 56 is provided on a surface on the opposite side of a side where the panel unit 30 is disposed in the first metal frame 55. Like the first heater 32 in the first embodiment, the first heater 56 includes a first heat generating wire (not shown) for supplying heat to the entire periphery of the first metal frame 55. The low thermal conductivity frame 54 same as the low thermal conductivity frame 33 in the first embodiment is provided on a surface on the opposite side of a side where the first metal frame 55 is disposed in the first heater 56.

In this way, in this embodiment, on a light incidence side of the panel unit 30, the second metal frame 61 disposed around the image forming region on the outer surface 43b of the first dustproof plate 43 is provided. However, a heater and a member such as a panel pressing member are not provided.

The other components of the image forming panel device 14 are the same as the components in the first embodiment.

Effects of the Second Embodiment

In the image forming panel device 14 in this embodiment, the same effects as the effects of the first embodiment can be obtained, for example, the periphery of the image forming region of the panel unit 30 is easily efficiently and equally heated and it is possible to reduce temperature unevenness due to the first heat generating wire.

In the image forming panel device 14 in this embodiment, the panel unit 30 is configured by the light transmissive panel unit that transmits light from the first surface 30a to the second surface 30b of the panel unit 30. The first metal frame 55 is disposed on the light emission side of the panel unit 30.

With this configuration, the first surface 30a of the panel unit 30 is heated by irradiation of the image light LL and heat is supplied to the second surface 30b of the panel unit 30 from the first heater 56 via the first metal frame 55. Consequently, it is easy to uniformly control the temperature of the entire panel unit 30.

Third Embodiment

A third embodiment of the present disclosure is explained below with reference to FIG. 8.

The configuration of a projector in the third embodiment is the same as the configuration in the first embodiment. The configuration of an image forming panel device in the third embodiment is different from the configuration in the first embodiment. Therefore, explanation of the entire configuration of the projector is omitted.

Figure 8:
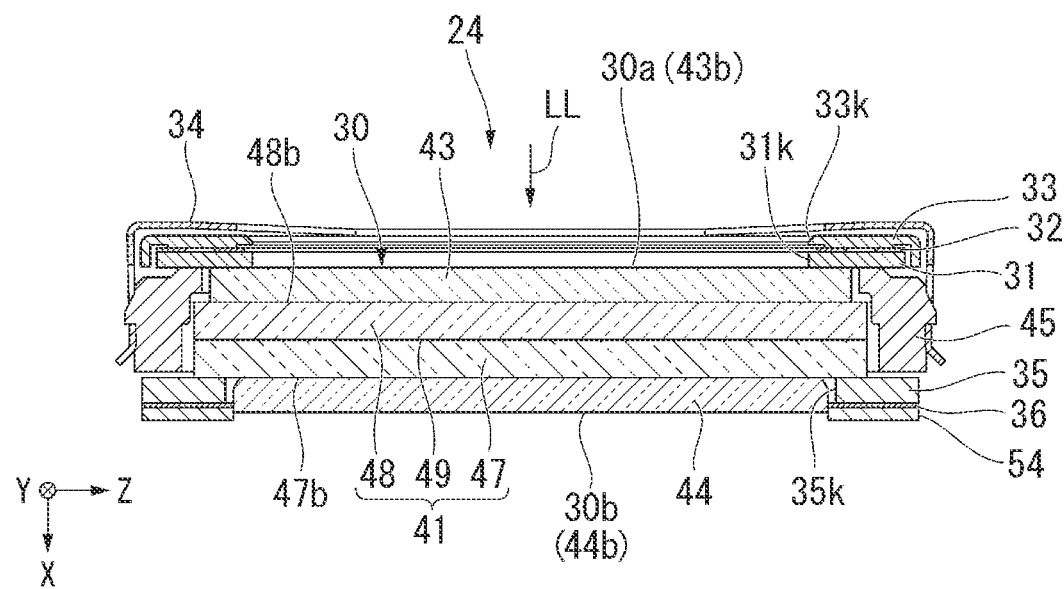
FIG. 8 is a sectional view of an image forming panel device in a third embodiment.

FIG. 8 is a sectional view of the image forming panel device in the third embodiment.

In FIG. 8, components common to FIG. 3 in the first embodiment and FIG. 7 in the second embodiment are denoted by the same reference numerals and signs and explanation of the components is omitted.

As shown in FIG. 8, an image forming panel device 24 in this embodiment includes the panel unit 30, the first metal frame 31, the first heater 32, the low thermal conductivity frame 33, a second metal frame 35, a second heater 36, and the low thermal conductivity frame 54.

The first heater 32 in this embodiment corresponds to the first planar heat generating body in claims. The second heater 36 in this embodiment corresponds to the second planar heat generating body in claims.

As explained above, in the image forming panel device 4 in the first embodiment, the metal frame, the heater, and the low thermal conductivity frame are provided only on the light incidence side of the panel unit 30. In the image forming panel device 14 in the second embodiment, the metal frame, the heater, and the low thermal conductivity frame are provided only on the light emission side of the panel unit 30.

In contrast, in the image forming panel device 24 in this embodiment, the metal frames, the heaters, and the low thermal conductivity frames are respectively provided on both of the light incidence side and the light emission side of the panel unit 30. Therefore, in this embodiment, the second metal frame 35 and the second heater 36 provided on the light emission side of the panel unit 30 are respectively the same members as the first metal frame 55 and the first heater 56 in the second embodiment, although the names are different. The second metal frame 35 may be made of the same heat conductive material as the heat conductive material of the first metal frame 31 or may be configured from a heat conductive material different from the heat conductive material of the first metal frame 31.

The other components of the image forming panel device 24 are the same as the components in the first embodiment and the second embodiment.

Effects of the Third Embodiment

In the image forming panel device 24 in this embodiment, the same effects as the effects in the first embodiment can be obtained, for example, the periphery of the image forming region of the panel unit 30 is easily efficiently and equally heated and it is possible to reduce temperature unevenness due to the first heat generating wire.

The image forming panel device 24 in this embodiment further includes the second metal frame 35 disposed around the image forming region on the second surface 30b of the panel unit 30 and having thermal conductivity and the second heater 36 provided on the surface on the opposite side of the side where the panel unit 30 is disposed in the second metal frame 35 and including the second heat generating wire for supplying heat to the entire periphery of the second metal frame 35.

With this configuration, heat is supplied not only from the light incidence side of the panel unit 30 but also from the light emission side of the panel unit 30 by the second heater 36 and the second metal frame 35. Consequently, it is possible to more quickly and more uniformly heat the entire panel 41.

The technical scope of the present disclosure is not limited to the embodiments explained above. It is possible to add various changes in a range not departing from the gist of the present disclosure.

For example, the image forming panel devices in the embodiments include the components such as the low thermal conductivity frame and the panel pressing member. However, the image forming panel devices do not always have to include these components. The image forming panel device according to the present disclosure may include an optical path changing element for performing a pixel shift. With this configuration, it is possible to achieve an increase in resolution while appropriately managing the temperature of a liquid crystal panel and maintaining response speed of liquid crystal.

In the embodiment, an example is explained in which the image forming panel device according to the present disclosure is mounted on the projector including the liquid crystal panel. However, the present disclosure is not limited to this. The image forming panel device according to the present disclosure may be applied to a projector including a digital micromirror device. The projector may not include a plurality of image forming panel devices and may include only one image forming panel device. The image forming panel device according to the present disclosure may be applied to an organic EL panel or the like.

Besides, specific configurations such as the numbers, the dispositions, the shapes, and the materials of the various components configuring the image forming panel devices and the projectors are not limited to the embodiments and can be changed as appropriate.

An image forming panel device according to an aspect of an embodiment may have the following configuration.

The image forming panel device according to the aspect of the present disclosure includes: a panel unit including a first surface and a second surface on an opposite side of the first surface and including a panel configured to emit image light; a first metal frame disposed around an image forming region on at least one of the first surface and the second surface of the panel unit and having thermal conductivity; and a first planar heat generating body provided on a surface on an opposite side of a side where the panel unit is provided in the first metal frame and including a first heat generating wire for supplying heat to an entire periphery of the first metal frame.

In the image forming panel device according to the aspect of the present disclosure, the panel may include an element substrate, a counter substrate, and a liquid crystal layer sandwiched between the element substrate and the counter substrate.

In the image forming panel device according to the aspect of the present disclosure, the panel unit may further include a dustproof plate provided on at least one of a light incidence surface and a light emission surface of the panel.

In the image forming panel device according to the aspect of the present disclosure, the panel unit may be configured by a light transmissive panel unit that transmits light from one of the first surface and the second surface to another of the panel unit, and the first metal frame may be disposed on a light incidence side of the panel unit.

The image forming panel device according to the aspect of the present disclosure may further include: a second metal frame disposed around the image forming region on the second surface of the panel unit and having thermal conductivity; and a second planar heat generating body provided on a surface on an opposite side of a side where the panel unit is disposed in the second metal frame and including a second heat generating wire for supplying heat to an entire periphery of the second metal frame.

In the image forming panel device according to the aspect of the present disclosure, the panel unit may be configured by a light transmissive panel unit that transmits light from one of the first surface and the second surface to another of the panel unit, and the first metal frame may be disposed on a light emission side of the panel unit.

In the image forming panel device according to the aspect of the present disclosure, the panel unit may further include a panel holding frame surrounding a peripheral edge of the panel and holding the panel, and a part of the first metal frame may be in contact with the panel holding frame.

The image forming panel device according to the aspect of the present disclosure may further include a low thermal conductivity frame provided in contact with the first planar heat generating body and having thermal conductivity lower than thermal conductivity of the first metal frame.

In the image forming panel device according to the aspect of the present disclosure, the first planar heat generating body may include a sheet-like base material and the first heat generating wire provided on the base material, the base material may include a plurality of opening sections provided to avoid the first heat generating wire, the first metal frame and the first planar heat generating body may be fixed via an adhesive, and a part of the adhesive may infiltrate into at least a part of the plurality of opening sections.

A projector according to an aspect of the present disclosure may include the following configuration. The projector according to the aspect of the present disclosure includes: an illumination unit; the image forming panel device according to the aspect of the present disclosure configured to modulate light emitted from the illumination unit and form the image light; and a projection optical unit configured to project the image light emitted from the image forming panel device.

What is claimed is:

1. An image forming panel device comprising:
a panel unit including a first surface and a second surface on an opposite side of the first surface and including a panel configured to emit image light;
a first metal frame disposed around an image forming region on at least one of the first surface and the second surface of the panel unit and having thermal conductivity; and
a first planar heat generating body provided on a surface on an opposite side of a side where the panel unit is provided in the first metal frame and including a first heat generating wire for supplying heat to an entire periphery of the first metal frame, wherein
the panel unit further includes a panel holding frame surrounding a peripheral edge of the panel and holding the panel, and
the first planar heat generating body is positioned with respect to the first metal frame and the panel unit via the panel holding frame.

2. The image forming panel device according to claim 1, wherein the panel includes an element substrate, a counter substrate, and a liquid crystal layer sandwiched between the element substrate and the counter substrate.

3. The image forming panel device according to claim 1, wherein the panel unit further includes a dustproof plate provided on at least one of a light incidence surface and a light emission surface of the panel.

4. The image forming panel device according to claim 1, wherein
the panel unit is configured by a light transmissive panel unit that transmits light from one of the first surface and the second surface to another of the panel unit, and
the first metal frame is disposed on a light incidence side of the panel unit.

5. The image forming panel device according to claim 1, further comprising:
a second metal frame disposed around the image forming region on the second surface of the panel unit and having thermal conductivity; and
a second planar heat generating body provided on a surface on an opposite side of a side where the panel unit is disposed in the second metal frame and including a second heat generating wire for supplying heat to an entire periphery of the second metal frame.

6. The image forming panel device according to claim 1, wherein
the panel unit is configured by a light transmissive panel unit that transmits light from one of the first surface and the second surface to another of the panel unit, and
the first metal frame is disposed on a light emission side of the panel unit.

7. The image forming panel device according to claim 1, wherein
a part of the first metal frame is in contact with the panel holding frame.

8. The image forming panel device according to claim 1, further comprising a low thermal conductivity frame provided in contact with the first planar heat generating body and having thermal conductivity lower than thermal conductivity of the first metal frame.

9. An image forming panel device comprising:
a panel unit including a first surface and a second surface on an opposite side of the first surface and including a panel configured to emit image light
a first metal frame disposed around an image forming region on at least one of the first surface and the second surface of the panel unit and having thermal conductivity; and
a first planar heat generating body provided on a surface on an opposite side of a side where the panel unit is provided in the first metal frame and including a first heat generating wire for supplying heat to an entire periphery of the first metal frame, wherein
the first planar heat generating body includes a sheet-like base material and the first heat generating wire provided on the base material,
the base material includes a plurality of opening sections provided to avoid the first heat generating wire,
the first metal frame and the first planar heat generating body are fixed via an adhesive, and
a part of the adhesive infiltrates into at least a part of the plurality of opening sections.

10. A projector comprising:
an illumination unit;
the image forming panel device according to claim 1 configured to modulate light emitted from the illumination unit and form the image light; and
a projection optical unit configured to project the image light emitted from the image forming panel device.

11. The image forming panel device according to claim 1, wherein
the panel holding frame has a protrusion section,
the first metal frame has a hole fitted the protrusion section, and
the first planar heat generating body has a hole fitted the protrusion section.

* * * * *